Figure 1:
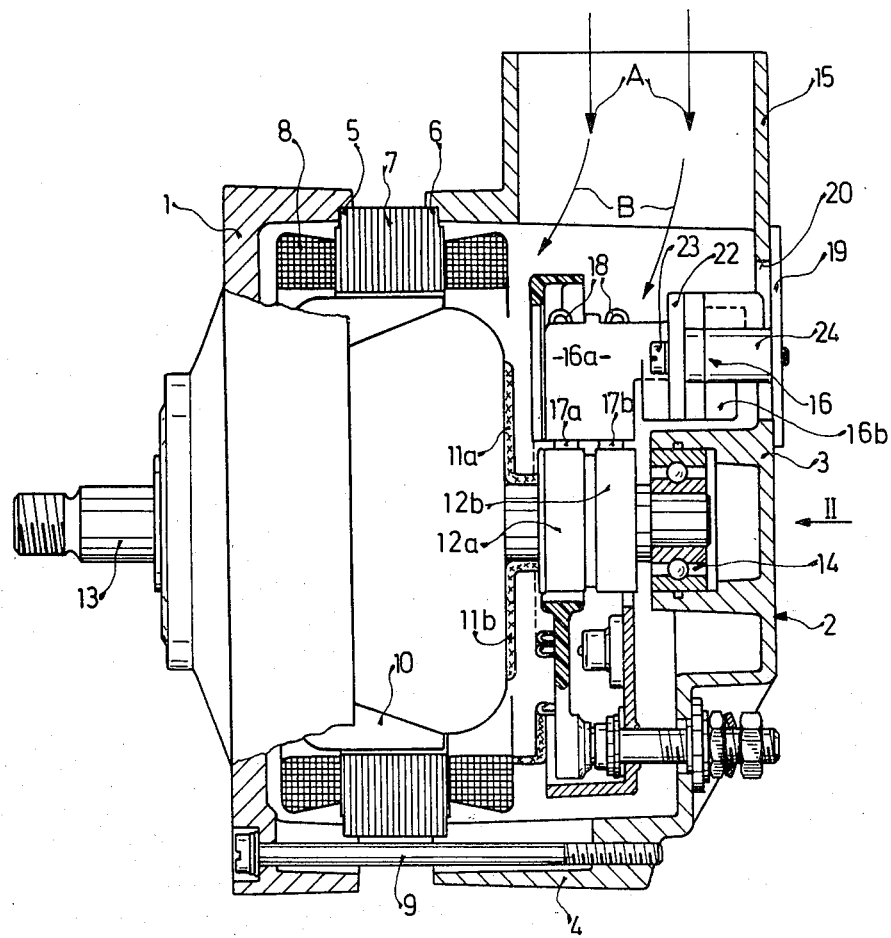

United States Patent [19]

Binder

[11] 4,293,788
[45] Oct. 6, 1981

[54] THREE-PHASE VEHICULAR GENERATOR CONSTRUCTION

[75] Inventor: Georg Binder, Bechhofen, Fed. Rep. of Germany

[73] Assignee: Robert Bosch GmbH, Stuttgart, Fed. Rep. of Germany

[21] Appl. No.: 42,361

[22] Filed: May 25, 1979

[30] Foreign Application Priority Data

Jun. 20, 1978 [DE] Fed. Rep. of Germany ....... 2826930

[51] Int. Cl.³ ............................................... H02K 9/28
[52] U.S. Cl. ..................................... 310/227; 310/58; 310/68 D; 310/91; 310/239
[58] Field of Search .................... 310/68 R, 68 D, 227, 310/89, 42, 239, 71, 58, 59, 60 R, 60 A, 91, 232

[56] References Cited

U.S. PATENT DOCUMENTS

| | | | |
|---|---|---|---|
| 3,041,484 | 6/1962 | Freer | 310/68 D |
| 3,673,447 | 6/1972 | Zubach | 310/89 |
| 3,731,126 | 5/1973 | Hagenlocher | 310/68 R |

FOREIGN PATENT DOCUMENTS

| | | | |
|---|---|---|---|
| 646599 | 7/1964 | Belgium | 310/68 D |
| 840636 | 7/1938 | France | 310/227 |
| 1088375 | 10/1967 | United Kingdom | 310/68 D |
| 1113428 | 5/1968 | United Kingdom | 310/68 D |

*Primary Examiner*—R. Skudy
*Attorney, Agent, or Firm*—Frishauf, Holtz, Goodman & Woodward

[57] ABSTRACT

To provide a fresh air duct for cooling of a brush holder-voltage regulator combination without introducing additional axial length to the overall alternator-regulator structure, a fresh air duct extends radially from the end bell of the alternator which is adjacent the slip rings, and the brush holder and voltage regulator are secured to a common support plate to form a single subassembly, the support plate covering an opening in the end bell of the alternator to permit introduction of the brush holder-voltage regulator assembly as a unit through the opening from the outside, positioning the brushes within the brush holder against the slip rings, and closing off the end bell to prevent ingress of hot air which may be in the engine compartment of the vehicle with which the alternator is to be used, so that the cooling air for the slip rings, brushes and the transistor voltage regulator is supplied as a stream of fresh air from the cooling air inlet stub which has its outlet positioned close to the brush holder-voltage regulator assembly.

5 Claims, 2 Drawing Figures

THREE-PHASE VEHICULAR GENERATOR CONSTRUCTION

The present invention relates to dynamo electric machines, and more particularly to an alternator for mobile application, especially for vehicular, automotive use, in which a voltage regulator of the semiconductor type is secured to the machine.

BACKGROUND AND PRIOR ART

Automotive-type alternators, particularly three-phase alternators, frequently include diode rectifier units directly secured to the structure; they may, also, have voltage regulators of the semiconductor type secured thereto. The voltage regulator is usually secured to the outside of the housing shell, for example to one of the end bells of the alternator. The voltage regulator is thereby cooled, by such cooling air as passes by or through the alternator itself. The cooling air enters the alternator through openings, typically in slit form, formed in the end bells of the structure. The cooling air thus passes the voltage regulator and is then, inwardly of the end bell, directed to cool the bearings, the rotor, and the slip rings and brush region of the structure.

Alternators are frequently installed in environments where the circulating air itself is already hot. This may interfere with cooling of the alternator and, in order to supply air to the alternator at ambient temperature, it has been proposed to attach an air supply duct to the alternator end bell, located axially behind the alternator itself to supply cooling air thereto from a region of the vehicle, with which the unit is used, where the general air temperature is at ambient level, rather than already heated. Such arrangements are difficult to assemble and install in automotive vehicles, and require an excessive amount of space for their attachment to the alternator structure itself. If the alternator is combined with a voltage regulator, it may be hidden within the air supply structure and thus difficult to maintain or replace, and additionally may be subjected to air flow which is contaminated, thus causing, potentially, damage to the voltage regulator.

THE INVENTION

It is an object to improve the structural arrangement of a generator, typically for mobile and especially for vehicular use, so that cooling air can be supplied both to the alternator as well as to a voltage regulator attached thereto without materially increasing the size of the alternator and providing for effective cooling of the voltage regulator and the slip ring structure, while still permitting access to the brush holder assembly as well as to the voltage regulator.

Briefly, a holder plate is provided closing off an opening in an end bell of the alternator, to which the brush holder for the brushes as well as the voltage regulator are secured. The opening is of such size that the brush holder and the voltage regulator can be passed through the opening so that, upon removal of the plate, the brush holder—voltage regulator combination can be removed as an entire assembly. The opening is positioned in the region adjacent the slip rings. The alternator structure itself is formed with a radial extension providing an air supply duct which preferably is so located that an air stream through this duct, drawn into the alternator by a fan arrangement rotating with its rotor, will pass by and around the voltage regulator as well as the brushes and slip rings.

The basic concept in accordance with the present invention is to so mount the voltage regulator, typically a semiconductor, transistorized voltage regulator, as well as the brush holder for the field supply brushes, that they can be attached to an essentially plate-like element which can be externally passed through an opening in the end bell of the housing. Thus, the entire structure which is necessary to supply and control field current is secured to a single subassembly—namely the plate-like element and readily positioned in the interior of the generator housing at a location where it is exposed to an intensive concentrated stream of cooling air. The plate-like element then serves not only as a support for the brush holder and the transistor regulator, but additionally closes off the end bell to thereby maintain the stream of cooling air within the housing and exclude ambient hot air from the interior of the housing, while also closing off the housing to protect the interior of the alternator against ingress of moisture, contamination, dirt, dust, or the like. Preferably, a portion of the end bell structure is so constructed that it forms a stub connection, for example to a cooling air duct, from which cooling air is directed into the interior of the housing of the alternator, passing by the brush holder—voltage regulator subassembly, and entering this interior in essentially radial direction. The cooling air will impinge on the transistor regulator first before passing by other elements of the alternator, or components located therein, for example rectifier assemblies and the like.

The structure of the alternator has the advantage that the overall dimensions can be reduced, while locating the transistor voltage regulator and the brush holder as a single unit within the generator in a position where they are protected from outside influences which might be damaging while, however, being exposed to cooling air at an optimum position, that is, where the air has not yet been heated by passing other heat-producing elements and before the stream of air has spread out. Locating a cooling air supply stub to supply air in radial direction hardly increases the axial length of the structure and thus permits constructing the alternator in compact form, without increasing its axial length.

Figure 2:
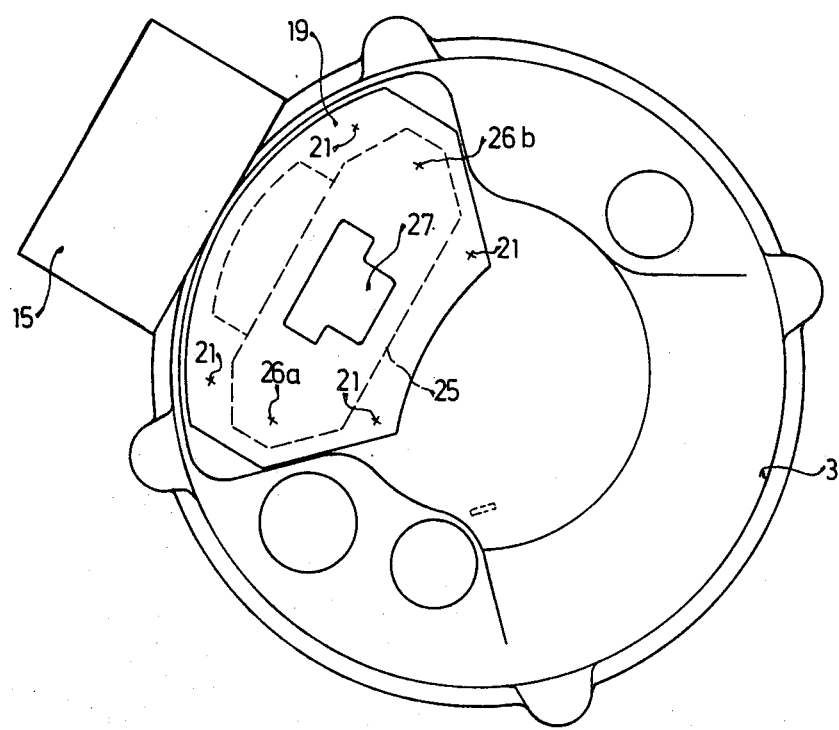

Drawings, illustrating a preferred example:

FIG. 1 is a longitudinal part-sectional view of an automotive-type three-phase alternator in which those elements not necessary for an understanding of the present invention have been indicated only schematically, or even eliminated; the general electrical and structural arrangement of the rotor and stator portions of the alternator can be in accordance with any well known and desired standard construction; and FIG. 2 is an end view of the alternator looked at in the direction of arrow II of FIG. 1.

The alternator of FIG. 1 is illustrated in the form of an automotive-type three-phase alternator having left and right end bells 1 and 2. The end bell 2 has an axial end portion 3 from which an essentially cylindrical wall 4 extends. The two end bells 1, 2 are formed with holding notches or grooves, preferably extending in ring form around the circumference to define fitting or seating surfaces 5, 6 in which the stator stack 7 with stator winding 8 is fitted. The end bells 1, 2, with the stator therebetween, are held together by suitably positioned screws 9, of which one is shown. This structure is well known in the automotive alternator field. The screws 9 clamp the stator which, electrically, forms the armature of the machine, between the end bells. The rotor is only schematically shown at 10. It includes a field winding (not visible in the drawings) which is supplied with field current over conductor leads 11a, 11b which, in turn, are connected to associated slip rings 12a, 12b. Field current is supplied over the slip rings by brushes 17a, 17b in engagement therewith. The slip rings 12a, 12b, as well as the field 10, are seated on a shaft 13. Shaft 13 is journalled in a bearing 14, located in the flat or bottom portion 3 of end bell 2, and in another bearing at the left side of the machine, and not visible in the drawing.

Fresh cooling air is supplied to the interior of the housing formed by the assembly of end bells 1, 2 with the stator by an inlet stub 15. The inlet stub 15 forming a duct element (see FIG. 2) is radially positioned on the housing, although it can also be located in a way to direct air tangentially into the interior of the housing which, generally, is cylindrical. Preferably, the stub 15 is unitary with the end bell 2. As shown, air is induced through stub 15 in the direction of arrows A, and passes, first, in radial direction to be then distributed into both radial and axial flow, as schematically shown by arrows B. Air is supplied to the stub 15 either by a fan or similar ventilator structure secured to the shaft 13 or by being positively supplied externally.

The holder 16a for brushes 17a, 17b and the voltage regulator 16b, together, form a subassembly generally indicated at 16, and secured to a plate 19. The subassembly 16 is located within the housing at a protected position, within range of the air current supplied through duct element 15. The subassembly is located within the structural outline, and protected by the end bell 2. The exact connection of the elements of the subassembly—brush holder and voltage regulator—is not critical; as shown, and in a preferred form, the brush holder 16a is formed with adjacently located brush guide holes in which the brushes 17a, 17b are slidably located. Current is supplied to the brushes by flexible leads 18, one of which at least is connected to a terminal of the voltage regulator 16b. In accordance with the invention, the transistor regulator and the brush holder are located on a common support, shown as the plate 19. The plate 19 covers an opening 20 formed in the end portion 3 of the end bell 2, so that the entire subassembly 16 can be introduced into the interior of the housing from the outside through that opening 20. The transistor regulator 16b can be electrically and mechanically connected to plug-in connections formed on the brush holder 16a itself, or can be independently secured to the plate 19. Preferably, plate 19 is a sturdy sheet-metal element which is large enough to completely cover the opening 20 in the end bell 2. It is secured in any suitable manner to the end bell, for example by screws 21 (schematically shown in FIG. 2) and thereby also reliably positions the brushes 17a, 17b with respect to the slip rings of the voltage regulator. Thus, plate 19 has the function not only of covering the opening 20, but also of forming a common support for the brush holder and the transistor regulator, and for positioning the brushes as well. Additionally, it acts, at least to some extent, as a heat conductor and heat sink for the transistor regulator and can further conduct heat to the end bell 2 which, usually, is made of metal, for example a casting.

The subassembly 16 formed by the brush holder and the voltage regulator can be secured to the plate 19 by attachment to a flange 22 which extends between the brush holder 16a and further supports the transistor voltage regulator 16b. The flange 22, which can be integral with the brush holder 16a, is secured by a screw 23 to the plate 19. Spacers 24 provide for proper positioning of the voltage regulator and brush holders 16a with respect to plate 19. The shape of the attachment flange 22 to attach the subassembly 16 to the plate 19 is shown in broken lines 25 in FIG. 2. Attachment points 26a, 26b show the location of screw connections between the flange 22 and the holding plate 19; in a preferred form, two screws 23 with spacers 24 are provided at the respective locations 26a, 26b.

Electrical connections can be made in various ways; for example, a plug-socket connection can be attached to the subassembly 16. The carrier plate 19, then, is preferably formed with an opening 27 (FIG. 2) of suitable size to receive a standard automotive plug, for example to make electrical connections with external, complementary systems and circuits which work together with the unit transistor voltage regulator 16b—brush holder 16a.

The attachment arrangement of the alternator structure to an automotive-type engine itself has been omitted; any suitable arrangement, such as a rocker arm, a U-bracket, or the like, may be used to tension a suitable drive belt passing around a pulley placed at the left end portion of shaft 13 (FIG. 1).

Various changes and modifications may be made within the scope of the inventive concept.

I claim:

1. Generator structure for use in mobile or vehicular application to supply on-board power for a self-contained network, in combination with a voltage regulator, wherein the generator has end bells (1, 2) defining a housing, a stator (7) located in the housing;

a shaft (13) rotatable in the housing;

a rotor (10) secured to the shaft and rotatable within the stator;

slip rings (12a, 12b) secured to the shaft;

a brush holder (16a) located within the housing;

brushes (17a, 17b) located in the brush holder and engaging the slip rings;

wherein a holder plate (19) is provided said brush holder (16a) and the brushes therein, and said voltage regulator (16b) being secured to said plate and forming a brush holder—voltage regulator assembly (16);

the end bell (2) adjacent the slip rings is formed with an opening (20) therein of such size that the brush holder—regulator assembly can pass therethrough from the outside for positioning of the brushes in the brush holder against the slip rings, and the entire assembly within the housing, said plate being larger than said opening (20) in the end bell and being fitted against and closing off said opening;

and means (15) supplying cooling air to the interior of the housing and positioned to direct cooling air to said brush holder—regulator assembly within the housing to place the brush holder and the regulator in the stream of cooling air being supplied into the housing comprising a duct element extending radially outwardly from the end bell (2) adjacent the slip rings and at least approximately aligned with said brush holder—voltage regulator assembly (16).

2. Generator—voltage regulator combination according to claim 1, wherein said plate (19) is secured to the end portion (3) of the end bell (2) adjacent the axial end of the generator at which the slip rings are positioned.

3. Generator—voltage regulator combination according to claim 1, wherein
   said brush holder—regulator assembly (16) further includes an attachment flange or rib (22), one side of said attachment flange or rib being secured to the brush holder (16a) and the other side of said attachment flange or rib being secured to the voltage regulator (16b); and means (23, 24) securing said attachment flange to the holder plate (19).

4. Generator—voltage regulator combination according to claim 3, wherein the attachment means for the flange or rib (22) to said plate (19) comprises a screw connection and spacer sleeves spacing the flange from the plate.

5. Generator—voltage regulator combination according to claim 1, further wherein said plate (19) is formed with a through-opening (27) to permit introduction of an external electrical plug connector for connection with the brush holder—regulator assembly (16).

* * * * *